April 3, 1928.　　　　E. A. GUSTAFSON　　　　1,664,679
INSTRUMENT PANEL
Filed Oct. 24, 1925
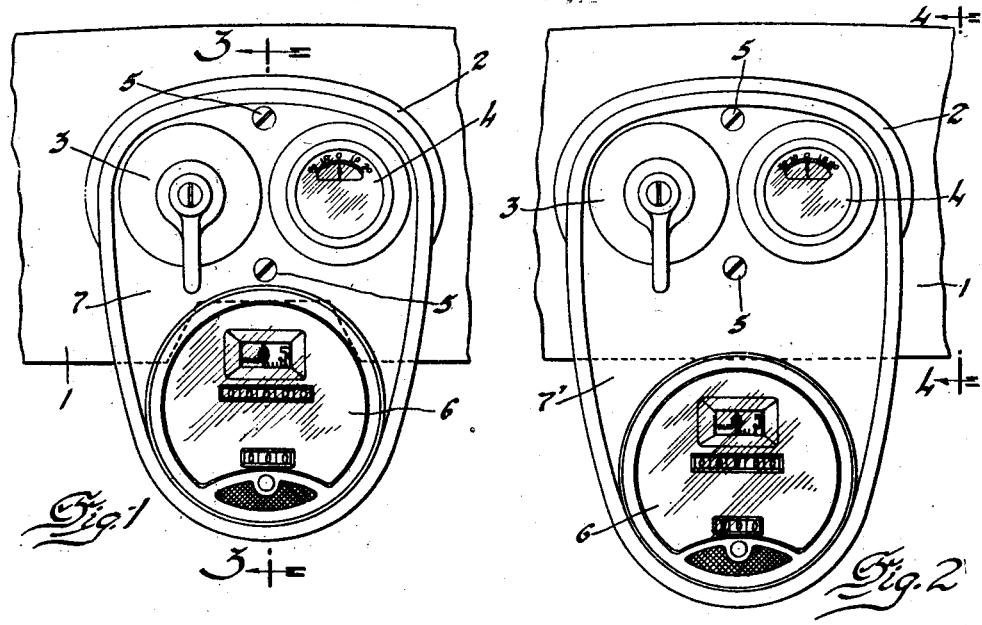
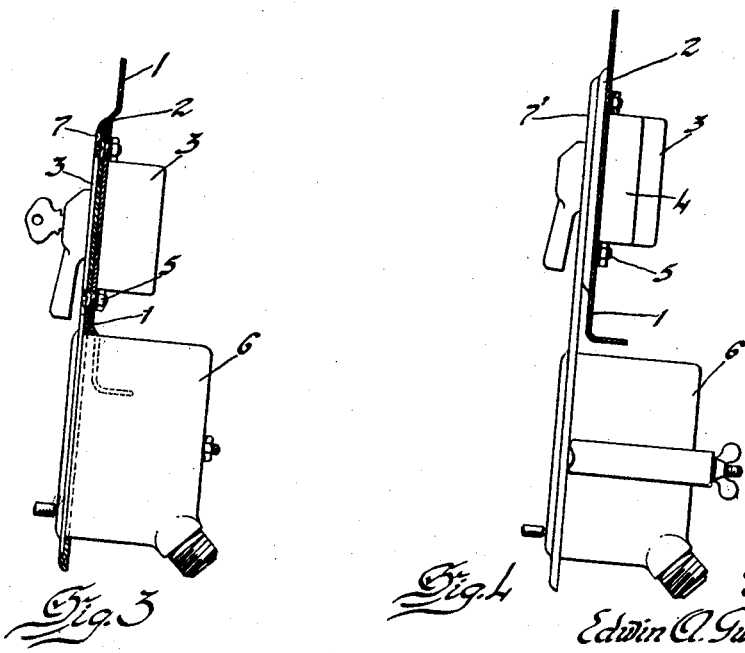
Inventor
Edwin A. Gustafson
By Blackmore, Spencer & Flint
Attorneys Patented Apr. 3, 1928.

1,664,679

UNITED STATES PATENT OFFICE.

EDWIN A. GUSTAFSON, OF FLINT, MICHIGAN, ASSIGNOR TO A C SPARK PLUG COMPANY, OF FLINT, MICHIGAN, A COMPANY OF MICHIGAN.

INSTRUMENT PANEL.

Application filed October 24, 1925. Serial No. 64,618.

This invention relates to means for supplementing the instrument carrying capacity of an instrument board. Its field of usefulness is obviously not limited to the specific application herein shown and described but its immediate object is to serve to add a speedometer to the well known Ford automobile.

In some of these vehicles a tank is placed in front of and so closely adjacent the instrument board that there is insufficient space for the location of a speedometer between the board and the tank. It is the purpose of this invention to locate the speedometer wholly or partly below the board where more space is available. The means for so locating the speedometer is arranged as a substitute for the instrument carrying panel on the car, whereby in a most convenient way a single panel may be used to accommodate the several instruments with substantially no change in the board. For a full understanding of the invention, reference is made to the following description and the accompanying drawing wherein Figure 1 is a front elevation of the instrument board with its panel attached. Figure 2 is a similar view of the modified form. Figure 3 is a vertical section on line 3—3 of Figure 1 and Figure 4 is a vertical section on line 4—4 of Figure 2.

Referring to the drawing and particularly to Figures 1 and 3, the numeral 1 represents the instrument board of a Ford automobile. In the car as equipped there are on this instrument board two instruments, a switch 3 and an ammeter 4. These instruments project forwardly through openings in the board and are mounted in a panel or plate secured to the board. It is common practice to add to the board a speedometer and it is in connection with the means for adding the speedometer that my invention is concerned.

The instrument board has a raised portion 2 of generally oval shape. From this raised portion is removed the panel found on the car carrying the two instruments mentioned above. In place of this Ford panel is secured a plate or panel 7 corresponding in shape at its upper part to the Ford panel but being elongated and extending below the instrument board. This new panel is apertured to receive and carry the instruments which have been removed from the Ford panel. The instruments will obviously pass through the board openings as before when the new panel is secured to the board by fastening means 5.

In the lower part of the panel is provided an opening wherein is received and carried the speedometer 6 its flange engaging the face of the panel.

The lower edge of the board is shown as cut away (see dotted lines in Figures 1 and 3) to permit the speedometer to pass therethrough.

A modified form is shown in Figures 2 and 4. In this form the substituted panel 7' is shaped to extend farther below the instrument board and the speedometer may be mounted therein without cutting away any part of the board.

By the provision of this new substitution plate or panel a symmetrical assembly of the several instruments is obtained. The speedometer is located in a position wherein there is ample space, and the change is accomplished with little or no change in the instrument board, consisting merely in the substitution of a new panel in one form, and in the other a slight cutting out of a portion of the lower edge of the board.

I claim—

1. A method of adding an instrument to the instruments on an instrument board wherein the instruments are carried by a panel secured to the board, consisting in removing the panel, substituting therefor a panel having instrument openings corresponding in dimensions and center distance to those of the panel removed, and an additional opening symmetrically positioned for the instrument to be added, the circumference of said additional opening lying wholly below the center line of the first mentioned openings of the supplemental panel, and mounting the several instruments in their respective openings.

2. A method of adding an instrument to the instruments on an instrument board wherein the instruments are carried by a panel secured to the board, consisting in removing the panel, substituting therefor a panel having instrument openings corresponding in dimensions and center distance to those of the panel removed, and an additional opening placed below and symmetrically positioned with reference to the first mentioned openings, the circumference of said additional opening lying wholly below the lower common tangent of said first mentioned panel openings, the latter opening positioned to extend below the instrument board.

In testimony whereof I affix my signature.

EDWIN A. GUSTAFSON.